United States Patent

[11] 3,595,123

| | | |
|---|---|---|
| [72] | Inventor | Hugo Wurzel<br>Rego Park, N.Y. |
| [21] | Appl. No. | 852,866 |
| [22] | Filed | Aug. 25, 1969 |
| [45] | Patented | July 27, 1971 |
| [73] | Assignee | Waldes Kohinoor, Inc.<br>Long Island City, N.Y. |

[54] RADIAL ASSEMBLY-TIRE SPRING RETAINING RINGS
5 Claims, 5 Drawing Figs.

| [52] | U.S. Cl. | 85/8.8 |
|---|---|---|
| [51] | Int. Cl. | F16b 21/18 |
| [50] | Field of Search | 85/8.8 |

[56] References Cited
UNITED STATES PATENTS

| 1,915,640 | 6/1933 | Alsaken | 85/8.8 |
|---|---|---|---|
| 2,491,306 | 12/1949 | Feitl | 85/8.8 |
| 3,340,760 | 9/1967 | Wormser | 85/8.8 |

*Primary Examiner*—Edward C. Allen
*Attorney*—J. Harold Kilcoyne

ABSTRACT: A clip-type retaining ring designed for radial assembly in the groove of a shaft or the like comprising diametrically opposed ring segments or jaws connected by a flexible bending arm having substantially increased arcuate length as compared to the arcuate length of the bending arm of known clip-type retaining rings, as endows said ring with large deflection possibilities and thereby increased holding power as compared to that of prior art clip-type retaining rings.

PATENTED JUL 27 1971 3,595,123
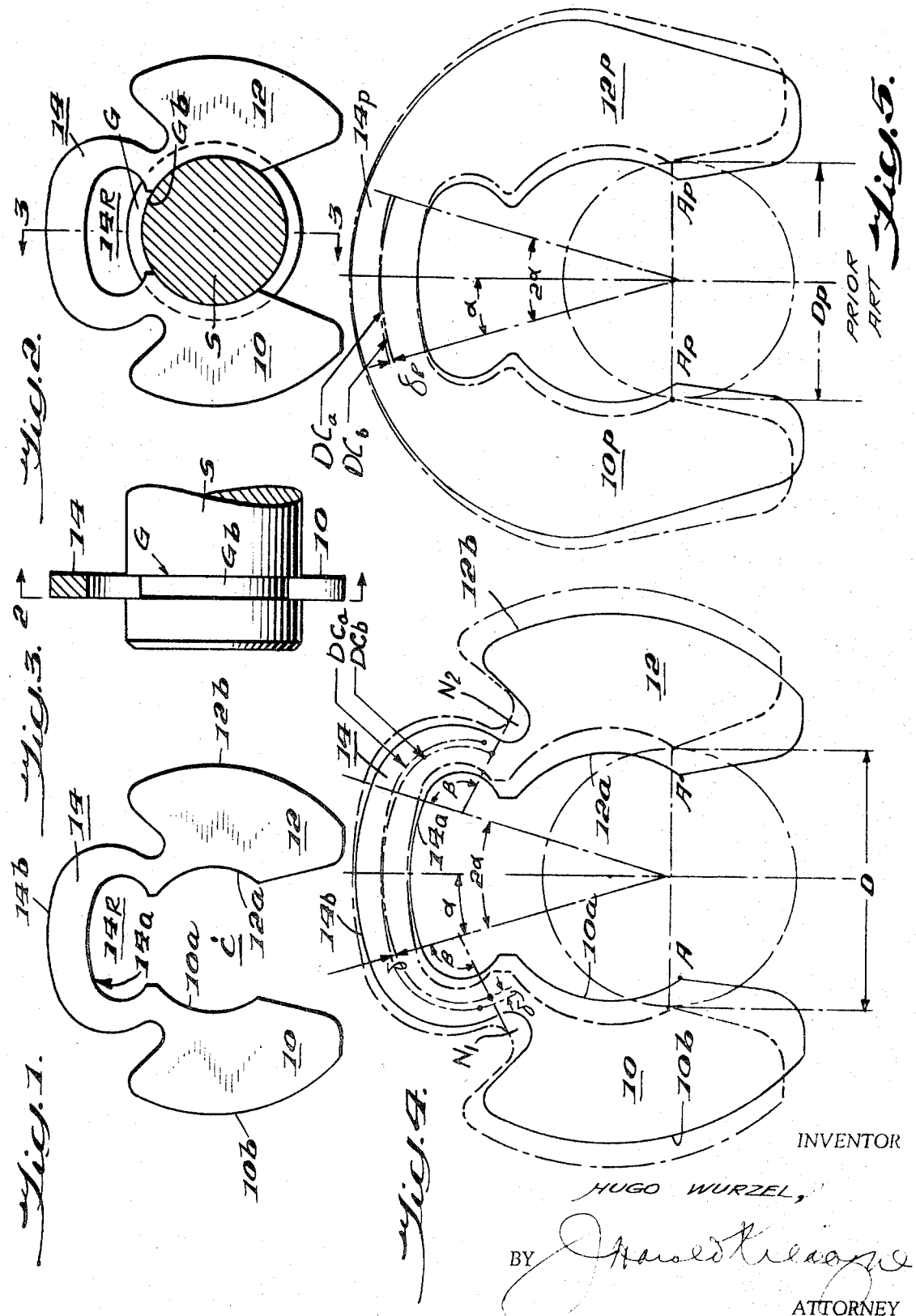
INVENTOR
HUGO WURZEL,
BY [signature]
ATTORNEY

RADIAL ASSEMBLY-TIRE SPRING RETAINING RINGS

This invention relates to improvements in radial assembly-type spring retaining rings, i.e., retaining rings designed to be assembled in precut grooves provided for their reception in shafts, studs and similar parts by simple radial movement thereof into said grooves, and which when so installed are capable of securing themselves with spring pressure to the groove bottoms and of serving as shoulders for accurately locating and/or retaining machine parts such as bearings on said shafts.

Retaining rings designed to be radially installed in shaft grooves as aforesaid are well known in the art and are commercially available in at least two structural forms, as follows:

1. "Open" retaining rings characterized principally by the ring body having arcuate length not substantially greater than 180° and hence a width of gap between its free ends as enables the ring to be spread the relatively small amount required for its assembly without unduly stressing same or taking on a permanent set. Typical open retaining rings of this form are disclosed in U.S. Pats. to Brozek No. 2,382,948, dated Aug. 14, 1945, and Feitl No. 2,491,306, dated Dec. 13, 1949 (FIGS. 7—9 form).

2. Clip-type retaining rings (sometimes also termed retaining clips), as disclosed in U.S. Pats. to Coburn No. 1,907,506, May 9, 1933, Benzing No. 2,026,454, dated Dec. 31, 1935, and Spicacci No. 2,136,155, dated Nov. 8, 1938.

While of the two ring forms discussed above, the "open" retaining ring is by far the better known and more widely used, it is nevertheless subject to the objections that the shaft shoulder formed thereby is only segmental and because of the large gap between the free ends of such a ring, its resistance to heavy thrust loads is relatively small.

Furthermore, although the assembly of open retaining rings in their grooves may be readily effected by a conventional applicator, the disassembly of open rings from their grooves is sometimes very difficult, due to the fact that the standard ring applicator is not designed to withdraw a seated ring from its groove. Also, in the absence of provision for their special handling, the smaller sizes of open rings are liable, when improperly handled, to become lost in the instrument or machine during assembly and/or disassembly and thereupon interfere with the smooth functioning thereof. In machines or assemblies under high electrical voltage, retrieval of a ring lost as aforesaid can be safely effected only by cutting off the electrical supply or by the use of a special insulated tool of an expensive nature.

The clip-type retaining ring (form 2 above) possesses features of advantage not possible of attainment with "open" retaining rings as above, such as increased arcuate length as compared to the arcuate length of the "open" retaining rings and uniform section height throughout substantially the full arcuate length of the ring body and hence a uniform depth of shaft shoulder. As previously constructed, however, the clip-type retaining ring, because of the short arcuate length of the flexible bending arm connecting the clip segments, and on which the permissible amount of opening of the gap between the free ends of the ring depends, has limited deflection potential.

Stated broadly, a major object of the present invention is that of providing an improved form and design of clip-type retaining ring which overcomes the above-mentioned and well recognized objectionable features of both the prior art "open" and clip-type retaining rings.

The above and other objects and features of advantage of a clip-type retaining ring or retainer clip of the invention will more fully appear from the following detailed description thereof, taken with the accompanying drawing, in which:

FIG. 1 is a plan view of a clip-type retaining ring of the present invention in the unstressed state;

FIG. 2 is a vertical section taken along line 2–2 of FIG. 3;

FIG. 3 is a vertical section taken along line 3–3 of FIG. 2;

FIGS. 4 and 5 are enlarged, partly diagrammatic views (mathematical symbols supplied) which compare the spreading action of the clip-type ring as herein proposed (FIG. 4) with that of a prior art clip-type retaining ring or retainer clip (FIG. 5).

Referring to the drawing in detail, a clip-type retaining ring or retainer clip according to the present invention comprises two circumferentially spaced-apart and diametrically opposed ring segments or jaws 10, 12 connected at their corresponding upper ends by a so-called bending arm 14 which extends between and is integral with said segments. The inner and outer edges 10a, 10b and 12a, 12b, respectively, of said ring segments are preferably concentric one with the other, and said inner edges 10a, 12a extend along opposed arcs of a circle whose center C provides the ring center and whose diameter is somewhat less than that of the circle of the bottom wall $G_b$ of the shaft groove G in which the ring is to be assembled.

As seen in FIG. 4 in particular, the free ends of said ring segments 10, 12 (as represented by the points A, A at the extreme ends of the inner arcuate edges 10a, 12a thereof) define the so-called ring gap which, as is conventional in clip-type retaining rings, has width somewhat less than that of the diameter of the groove-bottom circle $G_b$. Thus, assembly of the present ring in its shaft groove G requires that it be sufficiently flexible in its plane as to enable the ring segments 10, 12 (which are themselves nonflexible and nonresilient) to be spread apart by an amount that the width of the gap A equals the diameter of the groove-bottom circle $G_b$, and also that it be sufficiently resilient as to enable said ring segments to return to or substantially to their initial nonspread position in which their inner edges secure themselves with spring pressure to the groove bottom.

It is a feature of a retaining ring constructed according to the invention that the aforesaid requisite flexibility and resiliency (together sometimes termed "deflection potential") is developed within the ring body, which latter is also so fashioned and configured as to be capable of providing a substantially uniform-height shoulder when assembled in the groove of a shaft for which the ring is designed. More particularly, and again referring to FIG. 4, the outer edges 10b, 12b of the ring segments or jaws 10, 12 and the shoulder-defining major length portion of the outer edge 14b of the bending arm 14 which connects said segments extend along arcs (illustratively and for purposes of simple disclosure, arcs struck from the ring center) which cooperate to provide the ring body with a generally circular outer perimeter, thus imparting to the assembled ring the ability of forming an effectively uniform-height shoulder.

It is to be observed, however, that rather than said outer perimeter being continuous, its continuity is interrupted at two points or locations thereof which are disposed equal arcuate distances to the sides of the ring centerline by the provision of two relatively deep and specially configured cutouts $N_1$, $N_2$ which extend radially into the ring body and which in practical effect determine the arcuate length of said bending arm 14 and further renders its action more or less independent of that of the ring segments 10, 12. Also to be noted is that said notches $N_1$, $N_2$ are so disposed and shaped as to provide inwardly curving extremity portions at the ends of the bending arm which substantially increase its arcuate length as compared to that of the bending arms of the prior art clip-type retaining rings.

It is a further feature of the invention that, just as the inner and outer edges of the ring segments 10 and 12 and the outer edge of the bending arm 14 follow prescribed curvatures, so also does the inner edge 14a of the bending arm 14 follow prescribed curvature. That is to say, said inner edge 14a is constituted by the defining edge of an elongated C-shaped recess 14R sunk in the inner perimeter portion of the ring body which is disposed diametrically opposite the aforesaid ring gap, it being observed also that said elongated C-shaped recess 14R extends equal distances and symmetrically to the sides of the ring body centerline, and is turned on its side and so that its opening faces said ring gap.

As is clear from a consideration of FIGS. 1, 2 and 4, the provision of said recess 14R located as aforesaid results not only in the bending arm itself having elongated C-shaped configuration but also in said bending arm having substantially lesser radial width at any section along its full length than said ring segments 10 and 12.

According to another feature of the invention, the recess-defining edge 14a which provides the inner edge of the bending arm is so related circumferentially or arcuatewise to the outer edge 14b of the bending arm as to effect tapering of said bending arm 14, i.e. providing it with section widths (sometimes also called section heights) which progressively decrease from the arm middle section towards and fully through its inwardly curved extended end sections, and thus a clip-type retaining ring according to the present invention may be constructed so as to possess substantially greater deflection potential than is possible in prior clip-type retaining rings.

Referring now to FIG. 4 intended to illustrate graphically and by the use of mathematical symbols, etc. the improved functioning of a clip-type retaining ring constructed according to principles of the present invention, as compared to that of a prior art form of such a ring shown in FIG. 5, such shows that the provision of the two outer-edge notches or cutouts $N_1$, $N_2$ in the ring outer periphery serves to increase the arcuate length of the flexible bending arm 14 by the length of the arc of angle $\beta$ on each side of the ring centerline. Thus, rather than the bending arm having arcuate length of only $2\alpha$ as in FIG. 5, the bending arm 14 of the herein proposed ring will have the increased arcuate length of $2\alpha + 2\beta$.

Since the deflection of the bending arm $14_p$ of the prior art ring shown in FIG. 5 can occur only within the angle $2\alpha$, and since the arcuate length of said bending arm is small, the deflection $\theta_p$ is also small. In contrast, because of the increased arcuate length of the bending arm $2\alpha + 2\beta$ which characterizes the ring of the invention, the deflection $\theta$ of the bending arm 14 will be much greater.

When it is considered further that the amount of increase in gap opening, i.e. outward movements of points A, A, which determine the width of gap necessary to a clip-type retaining ring or retainer clip being assembled in its groove, is a function of its flexible bending arm, and further that such movements of points A,A during ring spreading is a function of the angle of deflection formed by the tangents to the neutral diameter curves $DC_b$ and $DC_a$ before and after ring expansion, it will be seen that where the angle of deflection is small, as is the case with the prior art ring shown in FIG. 5, the tangent is also small and therefore the permissible movements of points $A_p$ which determine the width of ring gap is also necessarily small.

As the bending arm 14 of a clip-type retaining ring according to FIG. 4 has substantially increased arcuate length ($2\alpha + 2\beta$), the deflection $\theta$ will be much greater and the tangent at the neutral diameter will have a considerably larger angle. Accordingly, spreading movement of points A, A, being a function of the tangent of this angle, can therefore be made much greater without increasing the stresses in the maximum section of the bending arm 14 of the herein ring of FIG. 4 in comparison with the prior art ring of FIG. 5 if all other overall dimensions are equal.

The greater deflection potential made possible by the substantially longer bending arm 14 according to the present invention provides the ring of the invention according to FIG. 4 with numerous advantages. For example, it permits a greater expansion and accordingly it may be assembled in a relatively deep groove and can have a considerably larger section height than the prior art clip-type retaining ring, without increasing the stresses in this section.

Another advantage of the clip-type retaining ring according to the invention is its increased holding power (pushout resistance) and accordingly a ring according to the invention is much safer in use.

Yet another advantage of the ring construction as herein proposed is that it may be designed with stresses larger than the maximum stresses of the material from which the ring is formed. Such will provide for predetermined permanent set occurring in the ring after its first application, with no further setting occurring in repeated applications. This presetting of the material is advantageous in that it forms residual stresses in the ring which further increases its ability to pressure-seat itself against the groove bottom.

Without further analysis, it will be appreciated that the improved ring of the invention satisfies the objectives and aims of the invention as stated in the foregoing.

What I claim:

1. A clip-type retaining ring designed for radial assembly in the groove of a shaft and the like and when so assembled being capable of providing an effectively uniform-height shoulder for retaining and/or locating a machine part thereon comprising: diametrically opposed ring segments providing clip jaws and a bending arm integral with and extending between corresponding one ends of said ring segments and connecting same in operative relation, the other ends of said ring segments being free of one another and being spaced a predetermined distance apart as provides a ring gap of width less than the diameter of the groove-bottom circle, the inner edges of said ring segments extending along arcs of a circle having a diameter substantially equal to that of the groove-bottom circle, the outer edges of said ring segments and of said bending arm being arcuate and cooperating to define a ring body having a generally circular outer perimeter capable when assembled of forming an effectively uniform-height shoulder, said outer perimeter being interrupted by two notches disposed at equal arcuate distances to the sides of the ring centerline and which extend generally radially into the ring body and determine the arcuate length of said bending arm and said notches being so shaped as to provide a bending arm with outer edge extremity portions which curve inwardly towards one another by a predetermined amount and thereby substantially extend the length of said outer edge of said bending arm, the inner edge of said bending arm being constituted by the defining edge of an elongate C-shaped recess formed in the inner perimeter portion of the ring body lying opposite said ring gap and which extends equal distances and symmetrically to the sides of the ring body centerline and is turned on its side and with its opening facing said gap, said outer and inner edges of the bending arm being so related one to the other that said bending arm itself has elongated C-shaped configuration.

2. A clip-type retaining ring according to claim 1, wherein said inner and outer edges of the bending arm are so related to one another both radially and circumferentially as to effect tapering of said bending arm from its middle section to and through its extended length portions.

3. A clip-type retaining ring according to claim 1, wherein said C-shaped bending arm is designed to be stressed beyond the elastic limit of the material from which the ring is fashioned by a predetermined small amount during the course of its first assembly in a groove, the circle of whose bottom wall has diameter corresponding to that for which the ring was designed, as results in the ring being provided with a predetermined small permanent set for all future assembly operations.

4. A clip-type retaining ring according to claim 2, wherein the bending arm is designed to be stressed beyond the elastic limit of the material from which the ring is fashioned by a predetermined small amount during the course of its first assembly in a groove, the circle of whose bottom wall has diameter corresponding to that for which the ring was designed, as results in the ring being provided with a predetermined small permanent set for all future assembly operations.

5. A clip-type retaining ring according to claim 2, wherein the outer edges of the ring segments of the shoulder-defining major length portion of the outer edge of the bending arm extend along arcs struck from the ring center.

UNITED STATES PATENT OFFICE
CERTIFICATE OF CORRECTION

Patent No.  3,595,123                         Dated  July 27, 1971

Inventor(s)  Hugo Wurzel

It is certified that error appears in the above-identified patent and that said Letters Patent are hereby corrected as shown below:

Title of invention "RADIAL ASSEMBLY-TIRE SPRING RETAINING RINGS" should read -- RADIAL ASSEMBLY-TYPE SPRING RETAINING RINGS --.

Signed and sealed this 16th day of May 1972.

(SEAL)
Attest:

EDWARD M. FLETCHER, JR.                ROBERT GOTTSCHALK
Attesting Officer                      Commissioner of Patents